(12) United States Patent
Faulhaber et al.

(10) Patent No.: US 10,811,915 B2
(45) Date of Patent: Oct. 20, 2020

(54) ROTOR FOR AN ELECTRIC MOTOR, ASSOCIATED MOTOR SHAFT, AND METHOD FOR PRODUCING SAID MOTOR SHAFT AND ROTOR

(71) Applicant: ARBURG GMBH + CO KG, Loßburg (DE)

(72) Inventors: Werner Faulhaber, Lossburg Wittendorf (DE); Eberhard Dufner, Starzach (DE); Jan-Peter Jastrzembski, Würzburg (DE); Simon-Frederik Koch, Karlsruhe (DE); Timo Müller, Karlsruhe (DE); Marina Mrkonjic, Karlsruhe (DE); Manuel Peter, Oberotterbach (DE)

(73) Assignee: ARBURG GMBH & CO KG, Lossburg (DE)

( * ) Notice: Subject to any disclaimer, the term of this patent is extended or adjusted under 35 U.S.C. 154(b) by 0 days.

(21) Appl. No.: 15/555,122

(22) PCT Filed: Mar. 4, 2016

(86) PCT No.: PCT/EP2016/054652
§ 371 (c)(1),
(2) Date: Sep. 1, 2017

(87) PCT Pub. No.: WO2016/139342
PCT Pub. Date: Sep. 9, 2016

(65) Prior Publication Data
US 2019/0036384 A1    Jan. 31, 2019

(30) Foreign Application Priority Data

Mar. 5, 2015   (DE) .................... 10 2015 203 908

(51) Int. Cl.
*H02K 1/02* (2006.01)
*H02K 1/27* (2006.01)
(Continued)

(52) U.S. Cl.
CPC ............. *H02K 1/02* (2013.01); *H02K 1/278* (2013.01); *H02K 1/30* (2013.01); *H02K 15/03* (2013.01);
(Continued)

(58) Field of Classification Search
CPC ............ H02K 7/04; H02K 1/02; H02K 1/278; H02K 15/12; H02K 2201/15; H02K 15/03; H02K 15/10
(Continued)

(56) References Cited

U.S. PATENT DOCUMENTS 4,910,861 A  *  3/1990  Dohogne  ............... H02K 1/278
                                                    264/272.2
6,081,052 A     6/2000  Hosoe
(Continued)

FOREIGN PATENT DOCUMENTS

DE    102004014640 A1    11/2005
DE    102004019710 A1    7/2006
(Continued)

OTHER PUBLICATIONS

International Search Report for corresponding application PCT/EP2016/054652 filed Mar. 4, 2016; dated Jun. 1, 2016.
(Continued)

*Primary Examiner* — Burton S Mullins
(74) *Attorney, Agent, or Firm* — Cantor Colburn LLP (57) ABSTRACT

A rotor (10) for an electric motor has a force-transmission region (11) which is operatively connected to a motor shaft (12). A torque-transmission region (13) which is composed of fibre composite materials is adjacent to the force-trans-
(Continued)

mission region (11). A magnetic connection region (14) and a region (15) for magnetic field guidance with magnets (16) are arranged on that side of the torque-transmission region (13) which is situated opposite the force-transmission region (11). The motor shaft can also be formed from fibre composite materials. Since the magnetic connection region (14) has a plastic which is provided with a magnetic or magnetizable filler, a rotor for an electric motor and also a motor shaft which interacts with said rotor which are of lightweight construction are provided, said rotor and motor shaft meeting the required performance criteria.

12 Claims, 5 Drawing Sheets

(51) Int. Cl.
*H02K 15/03* (2006.01)
*H02K 15/12* (2006.01)
*H02K 1/30* (2006.01)
*H02K 1/28* (2006.01)

(52) U.S. Cl.
CPC ............. *H02K 15/12* (2013.01); *H02K 1/28* (2013.01); *H02K 2201/15* (2013.01)

(58) Field of Classification Search
USPC .............................................. 310/44; 464/181
See application file for complete search history.

(56) References Cited

U.S. PATENT DOCUMENTS

| | | | | |
|---|---|---|---|---|
| 6,150,747 | A * | 11/2000 | Smith | H02K 1/185 |
| | | | | 310/156.28 |
| 6,963,151 | B2 * | 11/2005 | Van Dine | H02K 1/278 |
| | | | | 310/156.28 |
| 7,906,881 | B2 * | 3/2011 | Enomoto | H02K 15/03 |
| | | | | 310/156.43 |
| 8,110,959 | B2 * | 2/2012 | Hultman | H02K 1/02 |
| | | | | 310/216.113 |
| 9,455,600 | B2 * | 9/2016 | Yamamoto | H02K 1/278 |
| 9,735,638 | B2 * | 8/2017 | Herz | H02K 1/28 |
| 2003/0062790 | A1 | 4/2003 | Reiter | |
| 2003/0063993 | A1 | 4/2003 | Reiter | |
| 2007/0104400 | A1 | 5/2007 | Ito | |
| 2008/0044680 | A1 * | 2/2008 | Thibodeau | B29C 45/0013 |
| | | | | 428/547 |
| 2012/0091832 | A1 | 4/2012 | Soderberg | |
| 2014/0239748 | A1 * | 8/2014 | Herz | H02K 1/28 |
| | | | | 310/43 |
| 2014/0239749 | A1 * | 8/2014 | Fehn | H02K 1/04 |
| | | | | 310/43 |

FOREIGN PATENT DOCUMENTS

| | | | |
|---|---|---|---|
| DE | 102007006986 B3 | 6/2008 | |
| DE | 102008026648 A1 | 12/2009 | |
| DE | 102014001243 * | 8/2015 | ............... H02K 1/27 |
| GB | 1307831 | 2/1973 | |
| GB | 1531587 | 11/1978 | |
| JP | H0870541 A | 3/1996 | |
| JP | H1075543 A | 3/1998 | |
| JP | 2001037174 A | 2/2001 | |
| JP | 2002034188 | 1/2002 | |
| JP | 2007282408 A | 10/2007 | |
| JP | 2012085433 A | 4/2012 | |
| JP | 2013183535 A | 9/2013 | |
| JP | 2014072946 A | 4/2014 | |

OTHER PUBLICATIONS

JP Office Action; Application No. JP2017-546663; dated Jan. 17, 2020; 6 pages.
Machine Translation of JP Office Action dated Jan. 17, 2020; Application No. JP2017-546663; retrieved from https://www.j-platpat.inpit.go.jp/ dated May 15, 2020; 8 pages.

* cited by examiner

ROTOR FOR AN ELECTRIC MOTOR, ASSOCIATED MOTOR SHAFT, AND METHOD FOR PRODUCING SAID MOTOR SHAFT AND ROTOR

FIELD OF THE INVENTION

The invention relates to a rotor for an electric motor, and a motor shaft for a rotor of this type. The invention further relates to a method for producing a rotor of this type.

PRIOR ART

Electric motors are established in practical use in a great variety of versions. Depending on the preconditions of available electrical energy, required output, operating speed, dynamic behaviour and available installation space, they are arranged with permanent magnetic or electromagnetic excitation, supplied with d.c., a.c. or multiphase current, electronically or mechanically commutated, in synchronous or asynchronous design. Particularly for brushless, highly dynamic servo drives which are preferably constructed with an internal rotor, rotor concepts are known in which high-value rare-earth magnets are inserted into lamination sections which themselves are connected in a positively- and/or force-locking manner to the motor shaft which is usually made of steel.

Rotors with this construction fundamentally contribute to the mass inertia of a servo motor, which means that the dynamic properties of the motor are defined by this construction. Considering the construction in detail, the sheet lamination cut-outs or lamination stamped-out parts which are required to prevent eddy currents in the magnetic connection region are barely of consequence. Typically, the stamping waste of the stator laminations can be used for this. The inner part of the rotor serves for torque transmission and the outer region comprises the magnetic field guidance. In order to keep eddy current losses in the rotor as small as possible, the sheet laminations are coated with an insulating layer, the layer thicknesses being as small as possible. The laminations have the greatest influence on the moment of inertia of the rotor.

For the design of a high torque electric motor in a lightweight construction, it has previously been proposed in DE 10 2004 014 640 A1, to form supporting structural components as fibre composite materials in order to keep the interior of the electric motor free. The magnetic connection region was however not altered.

The same applies to US 2014/0239748 A1.

From GB 1 307 831 A, it is known to produce a magnetic core of an electric motor in consolidating and pressing a powder mixture of up to 90% iron powder and plastics material, which mixture is then cured and heated. An injection molding is not performed there.

From US 2003/0063993 A1, there is known a method for injecting ferromagnetic powder with an injecting unit and injecting non-ferromagnetic powder with a second injecting unit in order to produce an injection molded composite rotor component. For this purpose, an MIM material is used which is processable bound with a binder and later, in a further processing step, undergoes "debinding" and is "sintered".

US 2003/0062790 A1 discloses the production of a rotor disk wherein powder materials which are processable bound with a binder are pressed into a multipart frame as a template and, in a further processing step undergo "debinding" and are "sintered".

From DE 10 2007 006 986 B3, there is known a rotor wherein a fibre-reinforced plastics material is used for torque connection between the motor shaft and a classic laminated core. With a drive shaft remaining the same as regards the diameter, the base element of the rotor is formed partially conical externally.

In the rotor known from DE 10 2008 026 648 A1 with a laminated construction, a soft magnetic material is placed around a packet of "lamellae", in which the permanent magnets are incorporated. The lamellae are anchored in a plastics body which comprises a plastics hub between the shaft and the laminations.

U.S. Pat. No. 6,081,052 A discloses a laminated rotor which is produced in a thermal method with a brazing technique as a hard-soldering method in which intermediate layers are introduced between the laminated core and the permanent magnets.

From US 2012/0091832 A1 there is known a material mixture for use also in motor components which incorporates, inter alia, soft magnetic material in a non-metallic matrix.

From the prior art it is also known to balance rotors for electric motors in that either a positive balancing takes place by the application of weights, or negative balancing with a balancing disk, by material removal.

BRIEF SUMMARY

The disclosure provides a rotor for an electric motor and a motor shaft in a lightweight construction which meet or meets the required output criteria, and a corresponding production method.

For this purpose, the rotor is considered as regards the function of its parts wherein a force transmission region for transmitting moment and force to a motor shaft, a torque transmission region for transmitting the torque from the motor to the force transmission region, a magnetic connection region and also a region for magnetic field guidance in which the magnets are arranged, are considered. In particular, in the magnetic connection region, for magnetic field guidance, the sheet lamination is replaced by a thermoplastic material with a magnetic or magnetisable filler. The mass reduction is herein achieved primarily in that the introduction of the plastics material is restricted precisely to the magnetically relevant region. This polymer material is processed economically and reliably in the classic plastics injection molding process and also placed reliably with regard to the geometric arrangement.

If this arrangement is combined with the torque transmission region also being equipped accordingly with regard to its fibre composite materials, then a rotor can be manufactured economically in a lightweight construction.

The basis for the plastics material with the magnetic or magnetisable filler is provided by a thermoplastic which is filled with a soft magnetic filler with the greatest possible filling level. Filling levels of, for example, up to over 70 percent by volume are achievable herein. The relative permeability $p_r$ achievable is lower by powers of ten with these materials than with a classic "laminated" embodiment of a rotor, and the saturation is achieved significantly earlier. Nevertheless, with such an embodiment, a significant mass reduction is achievable. In addition, in the selection of the soft magnetic fillers, materials having the grain size of the application can be implemented accordingly, which enables good dimensioning and adaptation of the rotor to its intended use. This also influences the flowability of the compound that is to be expected.

If the filler grains or platelets are coated by the thermoplastic material surrounding them and are embedded spatially distributed in the insulating plastics, an electrical insulation between the individual soft magnetic filler grains results, which almost eliminates the eddy current losses of the rotor.

Therefore whereas the geometry of the high density compound is precisely restricted to the magnetically relevant region, the mass reduction can be increased in that the torque transmission to the motor shaft in the torque transmission region is implemented with a further material the density of which is significantly lower than the density of the highly filled plastics material. Preferably, in the torque transmission region, a further plastics material is used which is configured for improving the mechanical properties, preferably also with a fibre-reinforced material. The geometry of the torque-transmitting component is thus optimized to the lowest possible mass at optimum mechanical properties. This favourable and light material can also be produced in a plastics injection molding process wherein both materials can be produced together in a two-component system in a cycle as a mass product.

The magnets are preferably held in positively-locking manner in that the geometry of the outer contour of the magnets and of the region for magnetic field guidance are adapted accordingly.

Preferably, the rotor consists of at least one single disk that is self-supporting wherein the thickness of the disk or its length in the direction of the motor shaft preferably corresponds to the length of a magnet or to a multiple of the length of a magnet. However, it is also possible to mount magnets of different length on a disk in parallel or in series.

By means of the individual disks, through connection of a plurality of disks, the rotor length can be freely selected. The length is typically a whole-number multiple of the length of a disk of the rotor, although variants are also conceivable wherein disks of different thickness are used for a rotor. Thus a high degree of design freedom is achieved in respect of the size of the rotor, adapted to the respective output.

Each disk transmits its own torque. By this means, it is also possible, in conjunction with the motor shaft, to configure the individual disks differently so that, with increased spacing from the output side of the electric motor toward the B bearing, in which the sensor is usually arranged, they become internally smaller in diameter in respect of the interior region that is kept free for the motor shaft. Specifically, the larger the spacing of a disk from the output is, the lower are the torques that are transmitted, so that a smaller diameter suffices. Thus the mass of the rotor can be further reduced. Although the moment of inertia is not substantially reduced thereby, the overall mass is.

A motor shaft operatively connected to such a rotor can also be configured as a lightweight shaft and can also be made of fibre composite materials. A shaft of this type can be produced, for example, as a fibre-reinforced tube in glass fibre construction, carbon fibre construction, or composite fibre construction. In addition, the shaft can preferably be configured as a hybrid shaft with metallic journals made, for example, of steel at its ends at the two bearing points of the B bearing with the sensor and of the A bearing with the output.

It is also conceivable to replace the force and/or torque transmission region completely with a fibre-reinforced tube and also to form the shaft integrally with the torque transmission region to achieve a further mass reduction.

Preferably, according to the inventive method, the rotor, possibly together with the motor shaft, is produced by injection molding. Particularly effective herein is an injection molding production with a two-component process. A torque connection is injection molded from fibre-reinforced material and in the second process step, the magnetic connection region is made from SMC material (or vice versa). Following the injection molding, the rotor is finished and ready for the incorporation of the magnets. The magnets can also be molded in as insert parts, if required. Debinding and/or sintering is not required.

BRIEF DESCRIPTION OF THE FIGURES

The invention will now be described in greater detail using an exemplary embodiment illustrated in the accompanying figures. In the drawings:

FIG. 3 shows a rotor with a motor shaft in a three-dimensional representation, which is formed from a plurality of individual disks with a structure according to FIG. 2a.

DESCRIPTION OF PREFERRED EMBODIMENTS

Before the invention is described in detail, it should be noted that it is not restricted to the various components of the device and the various method steps, since said components and methods can vary. The expressions used here are intended merely to describe particular embodiments and are not used restrictively. If, furthermore, the singular or the indefinite article is used in the description or the claims, this also relates to a plurality of these elements, provided the overall context does not clearly reveal otherwise.

The Figures show a rotor for an electric motor, which normally cooperates with a stator (not shown in the drawings). The rotor is configured in the exemplary embodiment as an internal rotor, although in principle a construction as an external rotor is also possible, provided the force transmission region 11, the torque transmission region 13, the magnetic connection region 14 and a region 15 for magnetic field guidance are arranged in reverse order from outside to inside.

Figure 1A:
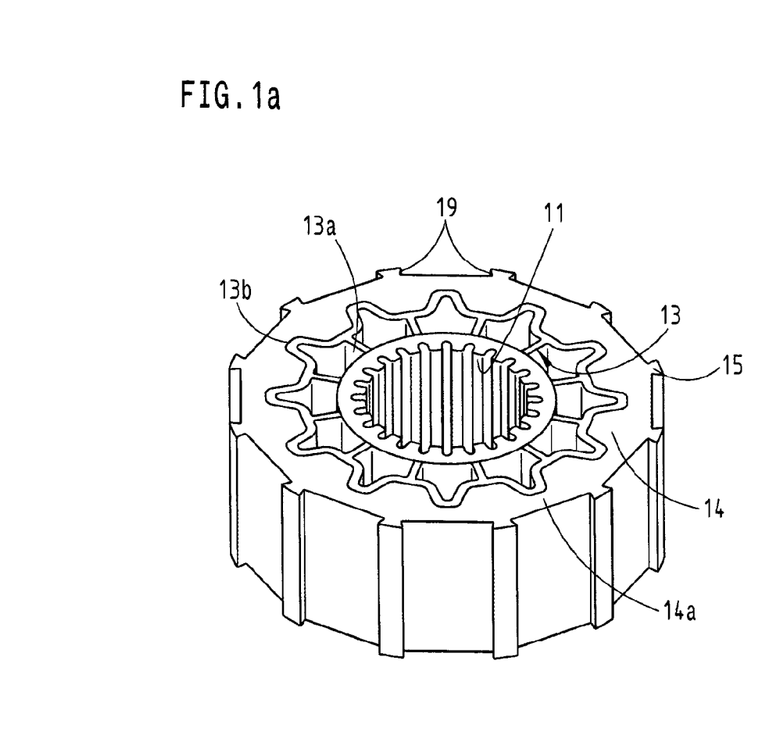
FIG. 1a shows a three-dimensional representation of a rotor without magnets with optimized contour and multiple spline connection.
Figure 1B:
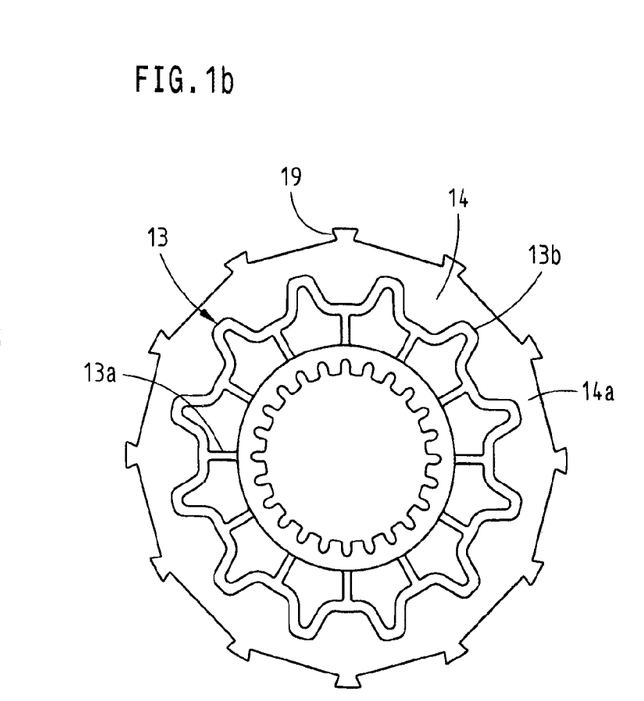
FIG. 1b shows a plan view of the rotor of FIG. 1a, FIGS. 2a, 2b show a representation of the rotor of FIGS. 1a, 1b with magnets mounted thereon.
Figure 3:
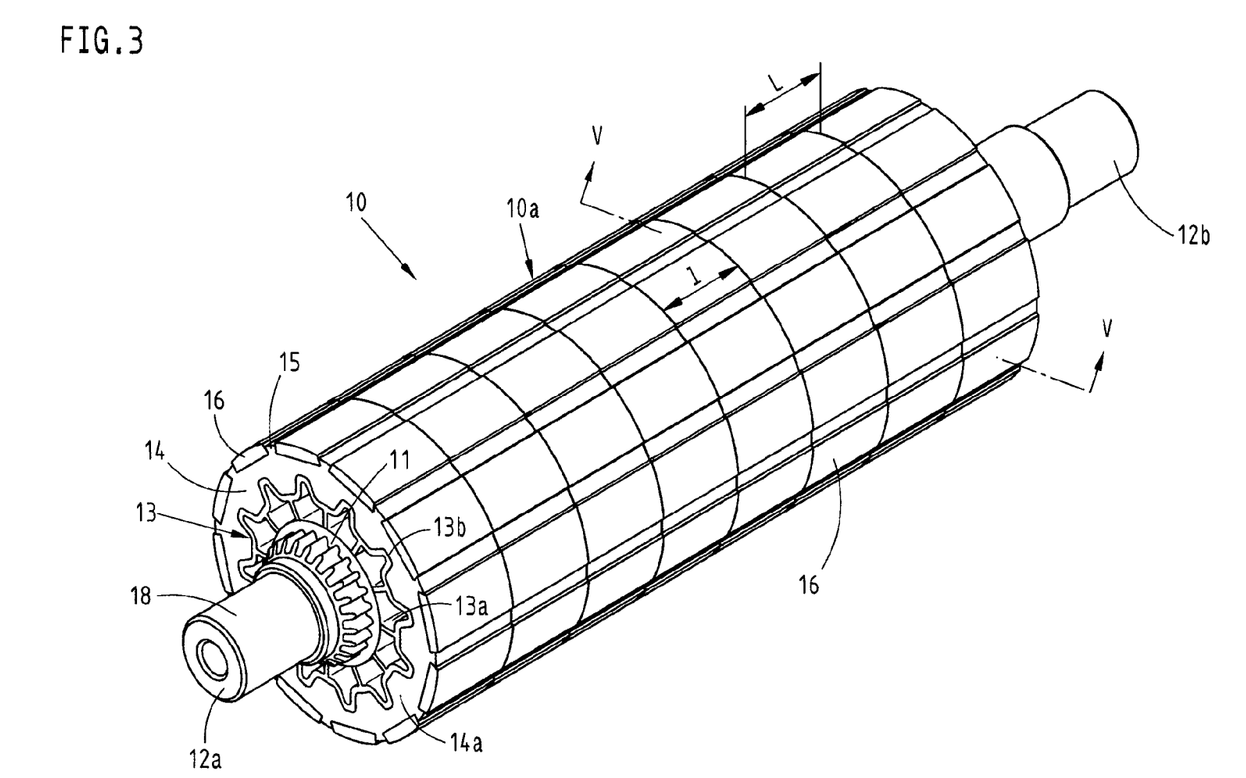

The rotor 10 has a force transmission region 11 which is suitable and intended for operative connection to a motor shaft 12 according to FIG. 3. In the exemplary embodiment, the transmission of the moments and forces from the rotor to the motor shaft 12 takes place via a multiple toothed connection in the force transmission region 11, although other connections, for example, via a hexagonal drive connection, are also conceivable. Adjoining the force transmission region 11 according to FIG. 1b is a torque transmission region 13 which is constructed of fibre composite materials. This region is optimized for this function since forces are introduced as a rotational force at the outer radius of the rotor 10 by means of the magnets 16 operatively connected with the currents introduced in the stator and are transmitted inwardly, in the Figures, via the force transmission region 11 to the motor shaft 12. In the torque transmission region 13 comprising web-like elements 13a, the transmission of the forces takes place in the exemplary embodiment from outside inwardly. It is also clearly apparent that the torque transmission region 13 has star-like points 13b between which bulges 14a of the magnetic connection region 14 are provided. The construction reflected therein both of the torque transmission region 13 and also of the magnetic connection region 14 corresponds to the force moment diagram for the transmission of the forces, that is, more material is provided where greater forces must be transmitted.

In the magnetic connection region 14, typically, metallic elements such as laminations are provided in order to prevent eddy currents. Adjoining the magnetic connection region 14 is a region 15 for magnetic field guidance which, in the exemplary embodiment, lies externally on the rotor and in which the magnets 16 are mounted. The magnetic connection region 14 and the region 15 for magnetic field guidance are arranged adjoining the torque transmission region 13, but on the side of the torque transmission region 13 opposite to the force transmission region 11. The construction shown in the Figures corresponds to the construction of the rotor as an internal rotor, that is, within an externally arranged stator, although in principle a corresponding construction with a reversed arrangement of the stated regions is possible for an external rotor.

In the exemplary embodiment, a thermoplastic material provided with a magnetic or magnetisable filler is now provided in the magnetic connection region 14, that is, the lamination otherwise normally used there is replaced by a highly filled plastics material. The basis for this is typically a thermoplastic material which is filled with a soft magnetic filler at the highest possible filling level, which is preferably not electrically conductive. Filling levels of up to >70 percent by volume are achievable herein. In the actual exemplary embodiment, e.g. a polyamide is highly filled with soft iron as the SMC (soft magnetic compound) material. The current filling level is herein 57%. In the classic plastics injection molding method, this polymer material is processed economically and reliably so that an optimized arrangement according to the Figures with corresponding bulges 14a and with direct connection to a correspondingly configured torque transmission region 13 is also possible. The relative permeability pr achievable with a plastics material of this type is orders of magnitude lower with these materials than with a classic "laminated" embodiment and the saturations are also achieved significantly earlier. In tests, however, it was found that the magnetic permeability thereby achieved for a lamination-free magnetic connection region thus constructed is absolutely sufficient for the operation of an electric motor. An embodiment of this type with highly filled thermoplastic material also leads to a significant mass reduction. In the selection of the soft magnetic fillers, the materials can also be adapted in the grain size to the respective application, which influences the flowability to be expected of the compound so that in this regard also, a design optimization to the respective purpose is possible. The filler grains or platelets are coated and electrically insulated by the thermoplastic material surrounding them and embedded spatially distributed in the insulating plastics which is ensured, particularly with injection molding and suitable homogenisation of the material, so that eddy current losses in the rotor can be almost eliminated.

A mass reduction is also achieved in that the geometry of the plastics material of high density, that is, the highly filled thermoplastic material or compound is restricted precisely to the magnetically relevant region. Thus whilst this material can be processed in the magnetic connection region 14, the torque transmission to the motor shaft 12 in the torque transmission region 13 can take place with a further plastics material, the density of which is significantly lower. The torque transmission can take place with a plastics material which is configured as a fibre-reinforced material to improve the mechanical properties. The geometry of the torque-transmitting component can thereby be optimized to the lowest possible mass with optimum mechanical properties. Since this favourable and light material can also be molded economically in a plastics injection molding method, a favourable and easily manufactured lightweight rotor results.

Figure 2A:
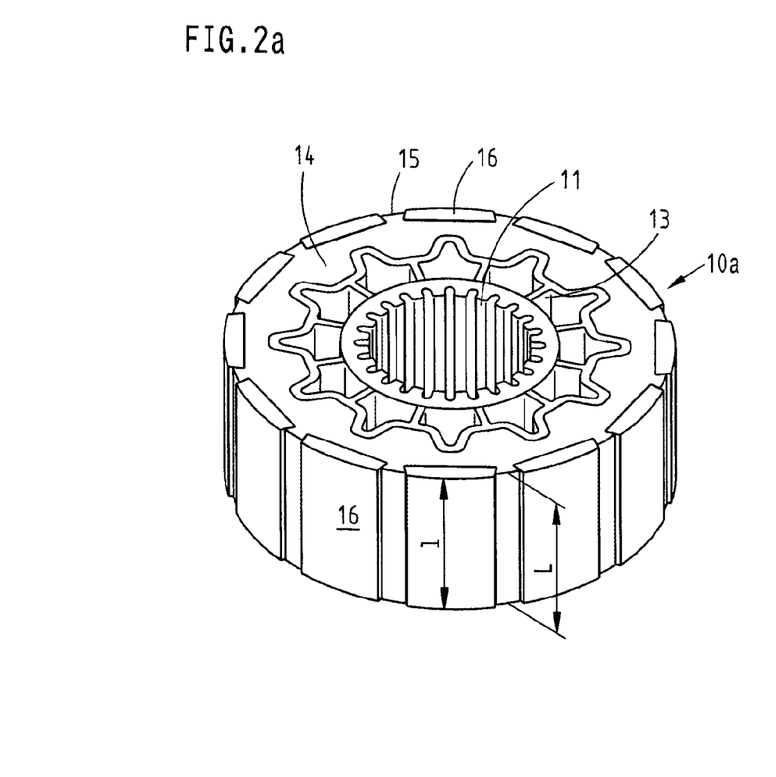
Figure 2B:
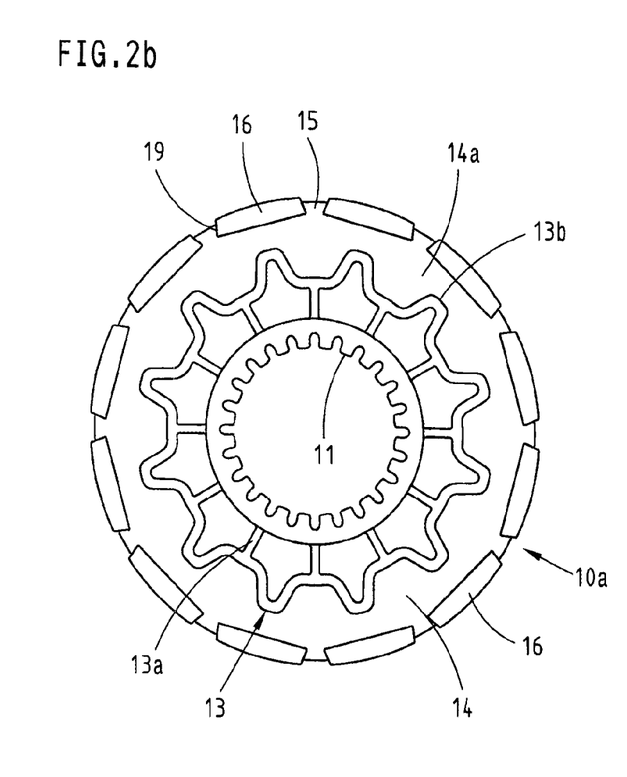

It is made clear by FIGS. 1b and 2b that the magnets 16 are held in positively-locking manner in that the geometry of the outer contour of the magnets 16 and of the region 15 are suitably adapted to one another for magnetic field guidance. In the exemplary embodiment, the magnets 16 are held by so-called dovetail guides 19, although this represents merely one example for a possible positively-locking retention.

The rotor 10 consists of at least one disk 10a wherein the length L of a disk 10a corresponds approximately to the length 1 of a magnet 16 or a multiple of the length 1 of a magnet 16 (see FIG. 2a). Such a construction permits a modular design as shown in particular in FIG. 3. The rotor 10 is firstly formed therein from individual disks 10a, so that the rotor length according to FIG. 3 can also be freely selected within particular limits. The length of the whole rotor is thus a whole-number multiple of a single disk 10a. However, variants are also conceivable in which rotor disks of different thickness are used for a rotor, which leads to a variable rotor length, individually adapted to the respective output requirement.

Each disk 10a of the rotor 10 transmits its own torque and it is therefore configured self-supporting. This also enables a further mass reduction in respect of the motor shaft 12. It is therefore conceivable, for example, to allow the motor shaft 12 to become thinner in the direction of the B bearing toward the sensor, that is, away from the output 18, which in FIG. 3 is provided at the left. This is thus associated therewith that the rotor 10 constructed from a plurality of disks 10a has a force transmission region 11 from disk to disk with different internal diameter such that the diameter lessens with increasing spacing from the output 18. If needed, the respective torque transmission region 13 of the individual disks can also be adapted accordingly and can then, if required, be thicker within the disk. Although the moment of inertia is not substantially reduced thereby, the overall mass is. It is also conceivable to form the force transmission region 11 integrally with the motor shaft 12.

Figure 5:
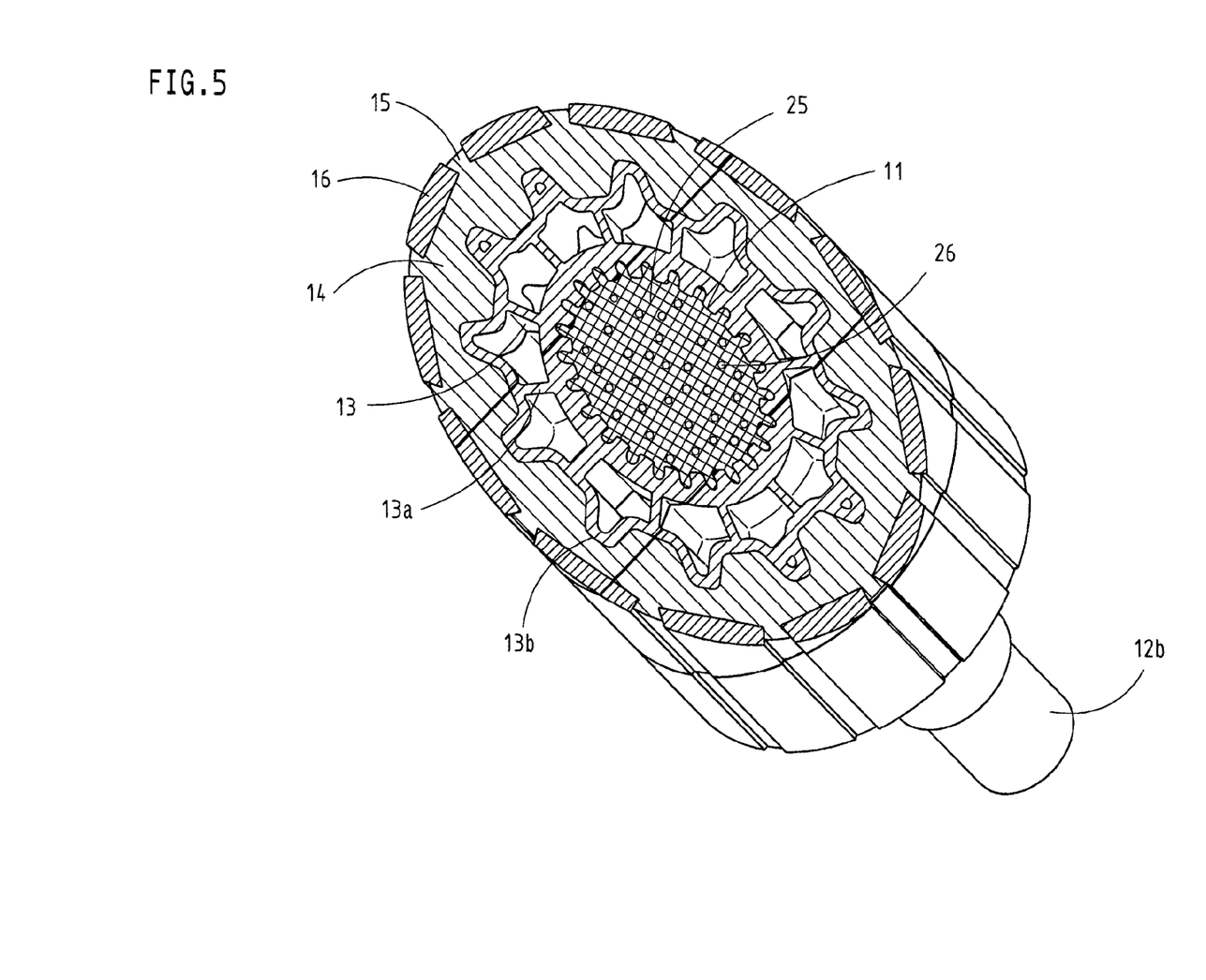
FIG. 5 shows a section through the rotor with embedded motor shaft.

The motor shaft 12 could be manufactured as a lightweight shaft, for example, as a fibre-reinforced tube of glass, carbon or composite fibre materials. Such a motor shaft 12 can be configured, for example, as a hybrid shaft with metal journals 12a, 12b at its ends which form the bearing points as A bearings with the output 18 and as B bearings toward the sensor. Such a motor shaft could be cast into the joined disks 10a of the rotor 10 by rotational molding. For this purpose, the disk 10a of the rotor 10 is preferably equipped with seals. Such a manufacturing step could take place as shown, for example, in FIG. 5. The tube is introduced into the interior of the force transmission region 11 with its fibres 26 together with a defined quantity of resin 25, which is subsequently distributed in the rotational molding method. Herein, the tube and the resin 25 comes into contact with the wall of the interior and impregnates, provided the material of the force transmission region offers the possibility therefor, the force transmission region 11 and/or becomes laid against the wall of the interior and is cured in this position.

It is also conceivable to replace the torque transmission region completely with the fibre-reinforced tube, that is, to produce the motor shaft 12 and the force transmission region 11 together from one material. In this case, the motor shaft would have a diameter offset behind the bearing and then adjoin the torque transmission region 13 and, if necessary, this entire part which consists of the motor shaft 12, the force transmission region 11 and the torque transmission region 13 could be made of the fibre-reinforced plastics material so that this region extends to the magnetic connection region 14. Through these measures, a further significant mass reduction would be possible.

The motor shaft 12 can be formed conical or stepped, wherein it narrows with increasing spacing from the output 18. The mass inertia is thereby reduced and the shaft diameter is adapted to the sensor. In the exemplary embodiment, the motor shaft 12 carries, at the level of the first disk on the left in FIG. 3, 100% of the torque and at the disk arranged at the other end, on the right in FIG. 3, less than 5% of the torque. Alternatively or additionally, the motor shaft 12 can also have a conical bore narrowing on one side, which enlarges with increasing spacing from the output 18.

In order to enable simple balancing of the rotor, the magnets 16 can be detected with regard to form and mass during the feed-in. This corresponds to an inline balancing of the individual disk 10a by directed magnet feed-in and positioning on the disk. The magnets have tolerances in the mass and can therefore be used in a targeted manner for balancing. The magnets 16 can thus be provided with an optimum mass distribution in sets per disk 10a for mounting. The relevant assembly sequence can be placed, for example, directly on the magnets. A possible unbalance of the magnetic connection region 14 and of the region for magnetic field guidance are determined before the mounting of the motor shaft 12, and largely eliminated through suitable selection of the angular position on the shaft. Thus a second inline balancing takes place by means of adapted angular positioning of the individual disks 10a on the motor shaft 12.

Additionally, it is known from the prior art to achieve a balancing with a balancing gel. Such a balancing gel can be introduced into the interior of the force transmission region 11 or of the torque transmission region 13, so that the rotor balances itself during start-up. The balancing gel becomes dynamically applied at the unbalanced site in a rotating hollow space. Such a balancing gel is known on the market in an associated process as the DFC® system.

Altogether, by the use of a thermoplastic material with a magnetic or magnetisable filler provided as a magnetic connection material that is variable according to the proportion by volume, which is used for minimizing the eddy current losses and for adapting the motor properties such as the dynamics and torque by simple means to the respective requirements, there results a rotor for an electric motor which is economical to manufacture. Fundamentally, this rotor 10 has a three-part shell structure with a region 15 for magnetic field guidance, a magnetic connection region 14 made of a correspondingly highly filled thermoplastic material, a torque transmission region 13 optimized for lightweight construction and stiffness made of preferably fibre-reinforced plastics and a force transmission region 11 with connection to a lightweight shaft.

Figure 4A:
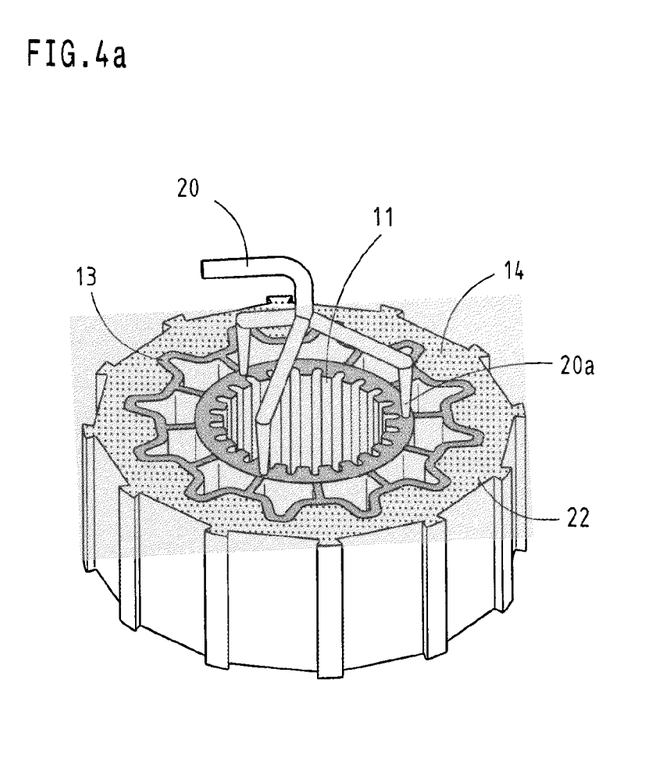
FIG. 4a-4b show a three-dimensional schematic representation of the rotor during the manufacturing process with associated sprue channels.
Figure 4B:
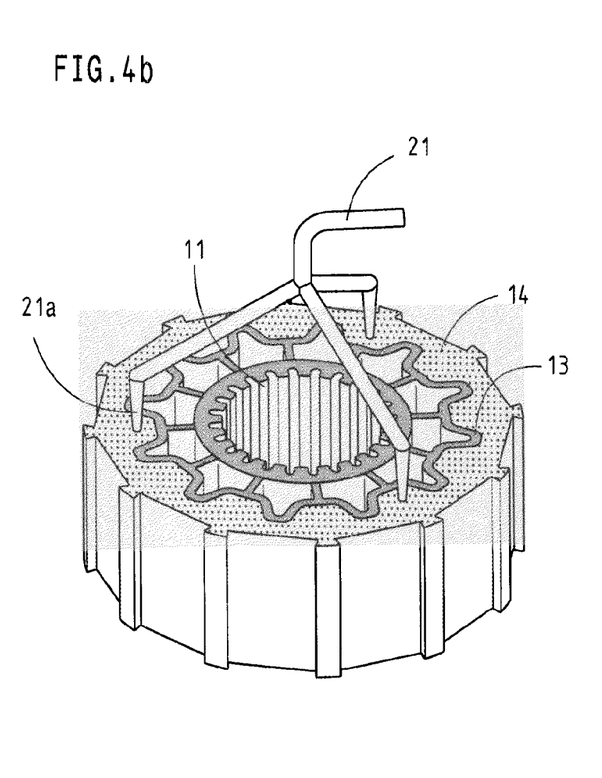

According to the method, the rotor 10 for an electric motor is manufactured, if appropriate, in conjunction with the motor shaft 11 by injection molding, preferably on a plastics injection molding machine. According to FIG. 4a, a fibre-reinforced plastics material is herein injected via the sprue body 20 and the runner 20a. By this means, the force transmission region 11 and/or the torque transmission region 13 are produced. At this torque transmission region thus produced, the lamination-free magnetic connection region 14 and the region 15 for magnetic field guidance are also formed by injection molding a thermoplastic material provided with a magnetic or magnetisable filler according to FIG. 4b, via the sprue 21 and the runner 21a. Preferably, this production can take place in one operation by two-component injection molding in an injection molding machine, preferably a plastics injection molding machine in that during the first injection, the one material is injected into the mold cavity for the force transmission region 11 and/or the torque transmission region 13. Once this material has cured, with a second mold cavity which adjoins the already manufactured torque transmission region 13, the second material is injected for the magnetic connection region 14 and the region 15 for magnetic field guidance. The magnets can be incorporated as insert parts, so that the rotor can be removed complete from the injection molding machine.

By means of the magnetic connection material producible by plastics injection molding, preferably two-component injection molding, it is possible with material-adapted inline methods to realize an effective and efficient lightweight connection of the motor shaft 12.

The invention claimed is:

1. Rotor for an electric motor including a least one disk, the at least one disk comprising:
   a force transmission region formed by fiber reinforced plastic materials or by plastics injection molding, which is configured for a force-transmitting operative connection to a motor shaft,
   a torque transmission region, made of fiber-reinforced plastic materials or by plastics injection molding, adjoining the force transmission region,
   wherein at least one of the force transmission region and the torque transmission region is formed by plastics injection molding,
   a magnetic connection region,
   a magnetic field guidance region, in which magnets are mounted,
   wherein the magnetic connection region and the magnetic field guidance region are arranged on the opposite side of the torque transmission region to the force transmission region,
   wherein the magnetic connection region and the magnetic field guidance region are both formed by plastics injection molding only, are both lamination-free and both comprise a thermoplastic material provided with a magnetic or magnetizable filler, and
   wherein the at least one disk defines a length, and wherein the torque transmission region is directly connected to the magnetic connection region along the length of the at least one disk, and
   wherein a density of the fiber composite materials is lower in the torque transmission region than a density of the thermoplastic material provided with the magnetic or magnetizable filler in the magnetic connection region.

2. Rotor according to claim 1, wherein the magnetic or magnetizable filler is a soft magnetic filler and wherein the thermoplastic material as a polymer material comprises a filling level of more than 70 percent by volume.

3. Rotor according to claim 1, wherein the magnetic or magnetizable filler is a soft magnetic filler and wherein grains of the soft magnetic filler are electrically insulated by the thermoplastic material.

4. Rotor according to claim 1, wherein the magnets are held in positively locking manner in the magnetic field guidance region.

5. Rotor according to claim 1, wherein the length of the at least one disk approximately corresponds to the length of a magnet or to a multiple of the length of a magnet.

6. Rotor according to claim 1, wherein the force transmission region is integral with the motor shaft.

7. Motor shaft for use with a rotor for an electric motor according to claim 1, wherein the motor shaft is at least one of made of fiber composite materials or formed by injection molding.

8. Motor shaft according to claim 7, wherein the motor shaft has metallic journals at its ends.

9. Method for producing a rotor for an electric motor, the rotor including at least one disk, the at least one disk comprising:
- a force transmission region formed by fiber-reinforced plastic materials or by plastics injection molding, which is configured for force-transmitting operative connection to a motor shaft,
- a torque transmission region, made of plastic materials or by plastics injection molding, adjoining the force transmission region,
- a magnetic connection region,
- a magnetic field guidance region, in which magnets are mounted,
- wherein the magnetic connection region and the magnetic field guidance region are arranged on the opposite side of the torque transmission region to the force transmission region,
- wherein at least one of the force transmission region and the torque transmission region is produced by plastics injection molding,
- wherein the magnetic connection region and the magnetic field guidance region are lamination-free and also produced by plastics injection molding only of a thermoplastic material provided with a magnetic or magnetizable filler,
- wherein the at least one disk defines a length, and wherein the torque transmission region is directly connected to the magnetic connection region along the length of the at least one disk, and
- wherein a density of the fiber composite materials is lower in the torque transmission region than a density of the thermoplastic material provided with the magnetic or magnetizable filler in the magnetic connection region.

10. Method according to claim 9, wherein the rotor is produced by injection molding two components in one working cycle on an injection molding machine.

11. Method according to claim 9, wherein for the production of the rotor in conjunction with the motor shaft in the interior of the force transmission region, a tube of composite fiber materials is inserted together with a resin, wherein by means of rotation of the rotor about its longitudinal axis, at least one of the resin or a balancing gel is applied against the wall of the interior and is cured there.

12. Method for producing a rotor for an electric motor, the rotor including at least one disk, the at least one disk comprising:
- a force transmission region formed by fiber-reinforced plastic materials or by plastics injection molding, which is configured for force-transmitting operative connection to a motor shaft,
- a torque transmission region, made of fiber reinforced plastic materials or by plastics injection molding, adjoining the force transmission region,
- a magnetic connection region,
- a magnetic field guidance region, in which magnets are mounted,
- wherein the magnetic connection region and the magnetic field guidance region are arranged on the opposite side of the torque transmission region to the force transmission region,
- wherein at least one of the force transmission region and the torque transmission region is produced by plastics injection molding,
- wherein the magnetic connection region and the magnetic field guidance region are lamination-free and also produced by plastics injection molding only of a thermoplastic material provided with a magnetic or magnetizable filler, and
- wherein the at least one disk defines a length, and wherein the torque transmission region is directly connected to the magnetic connection region along the length of the at least one disk;
- wherein for the production of the rotor in conjunction with the motor shaft in the interior of the force transmission region, a tube of composite fiber materials is inserted together with a resin, wherein by means of rotation of the rotor about its longitudinal axis, at least one of the resin or a balancing gel is applied against the wall of the interior and is cured there.

* * * * *